Jan. 27, 1959 J. A. TOLMAN 2,870,882
HORIZONTAL SLIDING WINDOW
Filed Oct. 20, 1952 3 Sheets-Sheet 1

INVENTOR.
JOHN A. TOLMAN
BY
ATTORNEY

Jan. 27, 1959    J. A. TOLMAN    2,870,882
HORIZONTAL SLIDING WINDOW
Filed Oct. 20, 1952    3 Sheets-Sheet 2
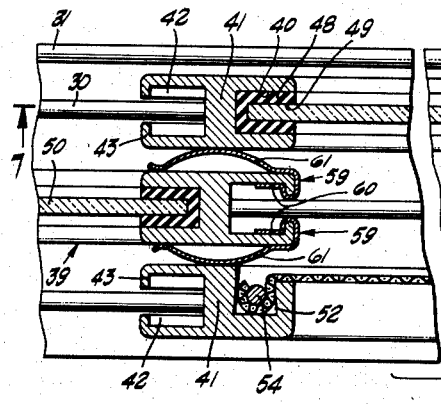
FIG. 4.
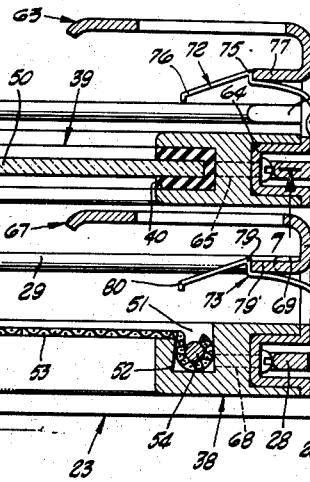
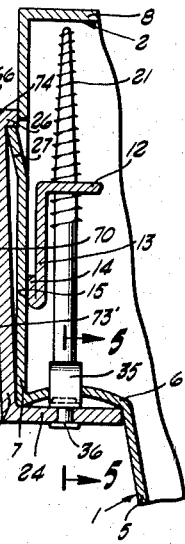
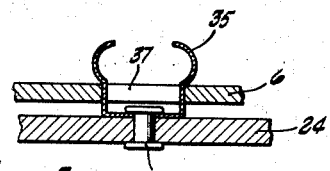
FIG. 5.
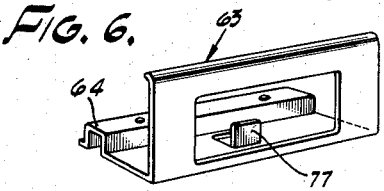
FIG. 6.
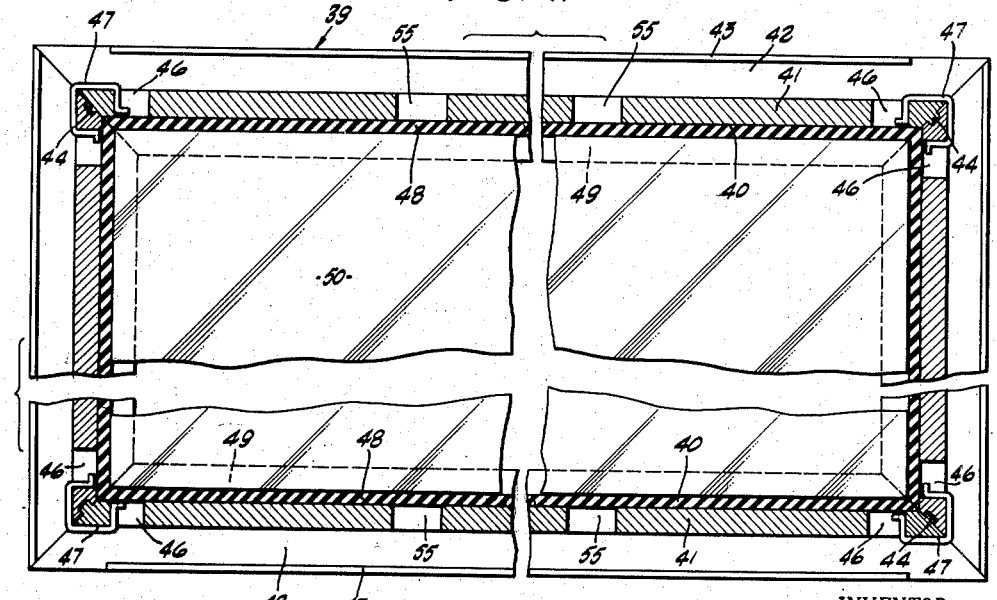
FIG. 7.
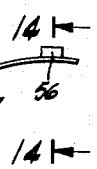
FIG. 13.
FIG. 14.
INVENTOR.
JOHN A. TOLMAN
BY
ATTORNEY

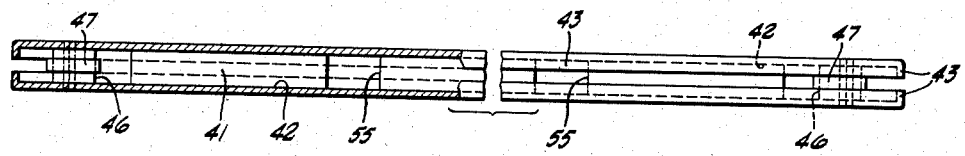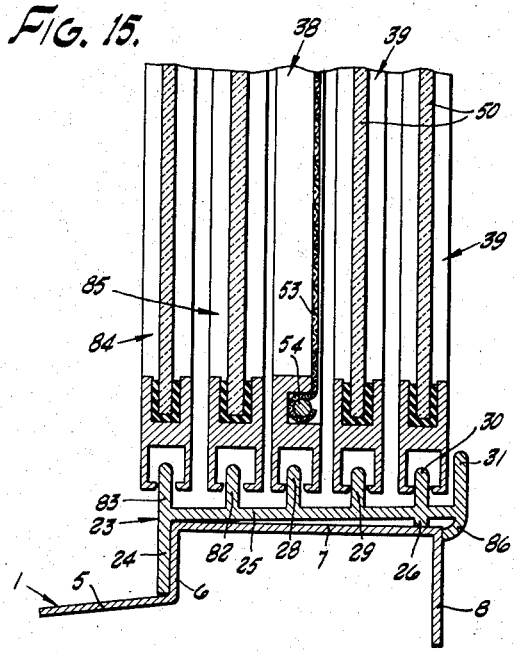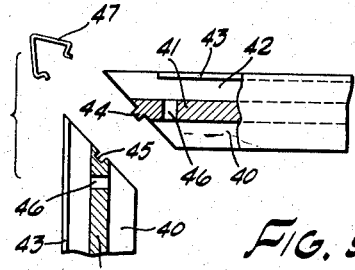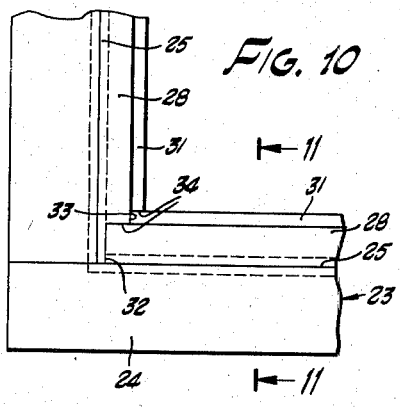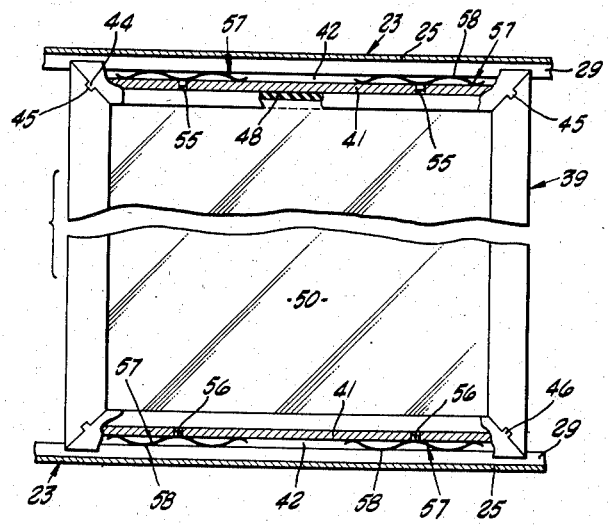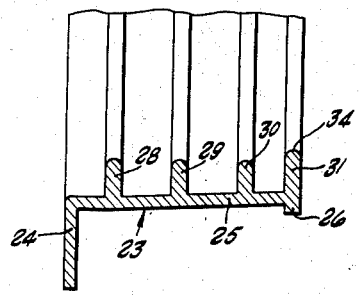

United States Patent Office 2,870,882
Patented Jan. 27, 1959

2,870,882

HORIZONTAL SLIDING WINDOW

John A. Tolman, Hollywood, Calif., assignor to Andean Corporation, Pasadena, Calif., a corporation of California Application October 20, 1952, Serial No. 315,656

3 Claims. (Cl. 189—75)

This invention relates to window construction for buildings and particularly to an improved form of metal window frame and sash.

The principal object of the invention is to provide a metal window frame and sash construction which is so constructed and arranged as to be readily installed in wall openings and as readily removed without damage to the wall surrounding the opening.

Another object of the invention is to provide a metal window construction in which all structural members are formed from lengths of rolled and die extruded metal members cut to the desired lengths for the specific size of window.

Another object of the invention is to provide a metal window frame structure and slidingly mounted sash and screen elements constructed and arranged to be self-clampingly mounted on the wall surfaces surrounding an opening to be closed by the window assembly.

A further object of the invention is to provide a metal window assembly composed of elements which may be assembled on the job and mounted in a wall opening without the need of highly skilled artisans or of special tools.

With the foregoing objects in view, together with such additional objects and advantages as may subsequently appear, the invention resides in the parts, and in the construction, combination and arrangement of parts described, by way of example, in the following specification of certain representative modes of execution of the invention; reference being had to the accompanying drawings which form a part of said specification, and in which drawings:

Figure 4 is a fragmentary sectional view taken on the line 4—4 of Figure 1;

Figure 5 is a further enlarged, fragmentary, sectional view taken on the line 5—5 of Figure 4;

Figure 6 is a perspective view of one of the window operating handles;

Figure 7 is a medial sectional view of one of the sash elements or assemblies taken as indicated by the line 7—7 of Figure 4;

Figure 8 is a top plan view of the sash element shown in Figure 7; portions thereof being broken away for clearness of illustration;

Figure 9 is an exploded fragmentary view, partially in section of one corner of a sash element;

Figure 10 is a fragmentary view of one corner of the sash rail components showing the mode of interlocking thereof;

Figure 11 is a sectional view taken on the line 11—11 of Figure 10;

Figure 12 is a reduced scale view taken substantially on the line 7—7 of Figure 4 and showing the spring glider mounting of the sash and screen elements;

Figure 13 is a fragmentary side elevation of one of the sash and screen supporting glider elements;

Figure 14 is a sectional view taken on the line 14—14 of Figure 13;

Figure 15 is a fragmentary sectional view taken transversely to the bottom portion of the window and showing a modification embodying the addition of storm window elements to the combination.

The illustrated embodiment of the invention may be conveniently considered as comprising three subassemblies, viz., the window frame structure, the sash rail structure, and the sash and screen structure; the latter including for convenience in description, the locking, manipulating, and sealing means for the sash and screen frames.

Figure 1:
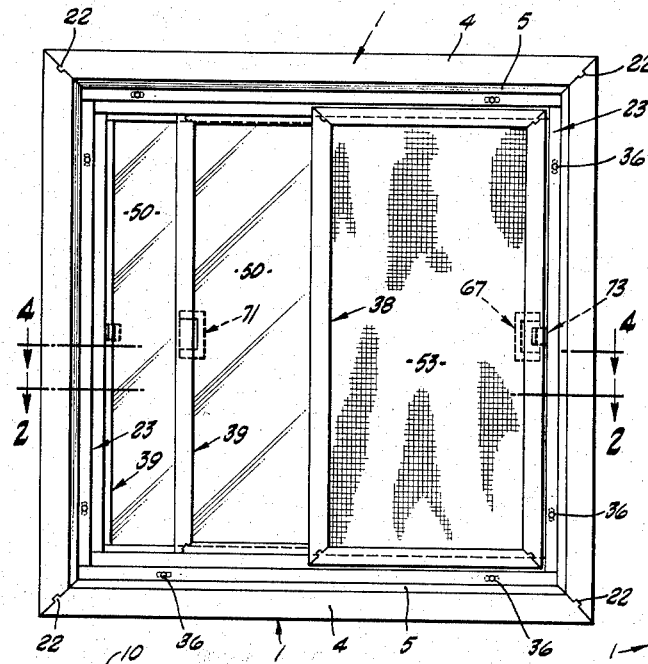
Figure 1 is a front view of a window assembly embodying the invention.
Figure 2:
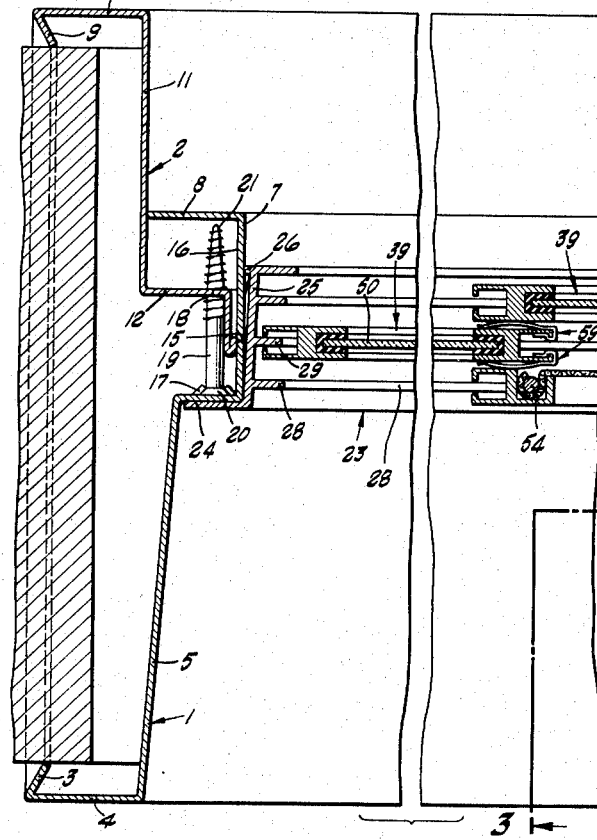
Figure 2 is a greatly enlarged, plan sectional view taken on the line 2—2 of Figure 1; portions of the window being broken away to permit showing of details on the scale of enlargement.

The window frame structure comprises pairs of members forming the top, bottom, and sides of the wall opening and each pair comprises an outer member 1, and an inner member 2; all of the outer members being of identical cross sectional form and all of the inner members also being of identical cross sectional form. In the description of the formation of the various parts of the invention, "forwardly" will designate a direction from the inside toward the outside of the building and "rearwardly" will designate the opposite direction while "inwardly" and "outwardly" will designate directions toward and away from the center of the window opening, respectively. Each outer member 1 is formed from sheet metal strip and comprises a short forwardly and outwardly inclined run 3 the edge of which engages the surface of the wall, an inwardly extending run 4, a relatively deep rearwardly and slightly inwardly inclined run 5, a short inwardly extending run 6, a longer rearwardly extending run 7 and a shorter outwardly extending run 8. Runs 6, 7 and 8 may be considered as a bead of rectangular cross-section projecting inwardly from the run or web 5, this bead being open on its inner side and adapted to conceal a flange 12 of a second strip member 2. Each inner member 2 is likewise formed of a metal strip and comprises a short, rearwardly and outwardly inclined run 9 the edge of which engages the inner face of the wall opposite the engagement thereof by the run 3, and inwardly extending run 10, a forwardly extending run 11 positioned to be engaged by the edge of the member 1, forming the end of the run 8 thereof, and an inwardly extending run 12, and a forwardly extending run 13 terminating in a return bend portion 14 the inwardly disposed face 15 thereof being disposed in engagement with the outwardly disposed face 16 of the run 7 of the associated outer member 1 as best shown in Figure 2. At spaced points along its length, each outer member 1 is provided with countersunk punched holes 17 in the run 6 thereof and each inner member is provided with mating threaded holes 18 in the run 11 thereof and screws 19 and having the heads 20 thereof disposed in the holes 17 and having the threaded portions 21 engaging the holes 18 serve to draw the inner and outer members toward each other and into clamping engagement with the opposite faces of the wall. The ends of each pair of members 1 and 2 are beveled to form miter joints and the ends of the runs 4 of the members 1 forming the top and bottom of the frame structure are provided with tongues 22, 22 projecting at right angles to the beveled ends thereof in the plane of the run 4 thereof and the opposite ends of the members 1 forming the sides of the frame structure are provided with mating notches which engage the tongues 22, 22 and thus form interlocking engagement between the top, bottom and sides of the frame structure as best shown in Figure 1. The runs 10 of the members 2 are provided with identical notches and tongues to effect a similar interlocking of those members.

The pairs of members forming the frame structure are prefabricated to exact lengths for each size of window opening and the pairs forming the top and bottom may first be installed in approximate position and lightly clamped to the wall surfaces by their clamping screws. Next, one of the pairs forming one of the sides and loosely connected is mounted in position with the end notches thereof engaging the tongues 22, 22 of the top and bottom members and is also lightly clamped in position by its clamping screws. Following this, the pair of members forming the other side of the frame structure is also similarly installed and lightly clamped to the wall surfaces after which, the entire assembled frame structure is checked for square and level position and adjusted if necessary and the screws 19 finally tightened to complete the mounting of the frame structure in the wall opening.

Figure 3:
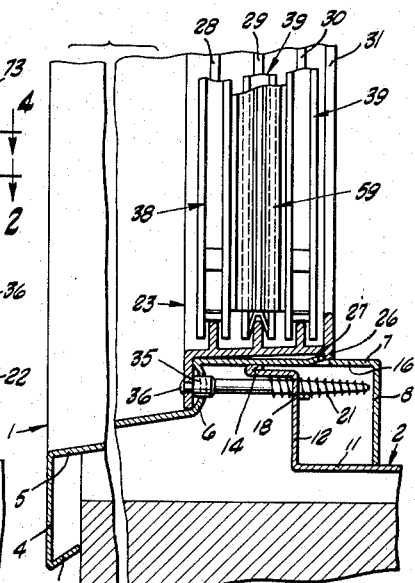
Figure 3 is a fragmentary sectional view taken generally on the line 3—3 of Figure 2.

The members 23 forming the top, bottom and side elements of the sash rail structure are preferably formed of extruded metal strip of identical cross section and comprising an outwardly extending outer flange portion 24 overlying and extending parallel to the runs 6 of the outer frame members 1 and a rearwardly extending base portion 25 overlying and extending substantially parallel with the runs 7 of the members 1 but being of lesser extent as best shown in Figures 2 and 3. The outer face of the base portion 25 at the rear end thereof is provided with an outwardly extending shallow rib 26 adapted to be engaged by a series of spring tongues 27 formed integrally with and projecting inwardly from the runs 7 of the members 1 and effective to lock the rail members against displacement when installed in the frame structure. The rail members in the form of the invention shown in Figures 1 to 4, 6, 10, 11 and 12, include a series of integrally formed rail elements projecting inwardly from the inner face of the base portion 25 and including a screen frame rail 28, a first sash rail 29 and a second sash rail 30, and at the rear end thereof the base member terminates in an inwardly projecting flange 31.

The mode of forming the corner joints between the rail structure members is shown in Figures 10 and 11. In the formation of the corner joints, each end of the members comprising the top and bottom members of the structure is cut to an overall length equal to the distance between the opposed runs 5, 5 of the frame structure members 1. The base portions 25 of these top and bottom members are cut to fit between the opposed faces 7, 7 as at 32 of the frame members 1 and the ends of the rails 28, 29, and 30 and of the flange 31 are cut back from the ends of the base portions for a distance equal to the thickness of the base portion as indicated at 33. The side members of the rail structure are cut to an overall length equal to the distance between the opposed inner faces of the base portions 25 of the top and bottom rail members and the rail and flange portions thereof are cut back from the ends sufficiently to fit between the innermost extremities of the corresponding rail and flange portions of the top and bottom rail members as at 34. Thus, after the frame structure has been installed the top and bottom rail members are placed in position being held in place by spring clips 35 secured to the rear face of the flanges 24 of the rail members by rivets 36 and engaging rectangular openings 37 in the runs 6 of the top and bottom frame members 1 (see Figure 5). The side members of the rail structure are then forced into place; the above described form of corner construction permitting them to be thus installed. When positioned against the face of the runs 6, 6 of the side frame members, spring clips 35 and the spring tongues 27 as above described in connection with the top and bottom members, but associated with the side members of both structures serve to hold the rail structure in assembly with the frame structure.

The sash structure comprises at least one screen frame 38 and at least two sash frames 39. The sash frames are formed of extruded metal bars of elongated H-section as best shown in Figures 2, 4 and 6 and comprising a gasket receiving channel 40, a center rib 41 and a rail receiving channel 42; the legs of the H-section forming the channel 42 being slightly inturned as at 43. The ends of the H-sections forming the top, bottom, and sides of a sash receiving frame are beveled to form miter joints and the members forming the bottom and top sash frame elements are provided with centrally disposed, transversely extending tongues 44 engaging mating grooves 45 in the ends of the side elements. Adjacent the beveled ends thereof each of the sash frame elements is provided with a rectangular hole 46 extending through the center rib portion thereof and at each corner joint a heavy spring clip 47 extends over the outer faces of the center ribs 41 with the ends thereof entering the holes 46 as best shown in Figure 7 to hold the sash frame forming elements in assembly. Mounted in the channel 40 of the sash frame is a resilient gasket element 48 of the U-shape in cross section and mounted in the groove 49 in said gasket is a window pane 50. In practice, the gasket is applied to the pane and the assembled gasket and pane are assembled into the frame elements as an incident to the interconnection of the frame elements of a sash frame.

The screen frame elements are similar to the sash frame elements so far as the rail receiving groove 42, the center rib 41 and the interconnection by the spring clips 47 is concerned and consequently, the same numerals have been applied to those portions. At the inner edge, however the members are formed with a channel 51 extending inwardly from the rear face thereof; the bottom of said channel being slightly wider than the opening thereof and the innermost face 52 of the channel being slightly inwardly inclined toward the bottom thereof. The screen 53 is cut slightly larger than the perimeter of the channel 51 and a wire loop 54 of the same size as the channel is forced into the channel 51 after the formation of the screen frame bending the edges of the screen around it and locking the screen in the frame as best shown in Figures 2 and 4.

Referring next to Figures 12, 13 and 14, there is shown the mode of mounting the sash and screen assemblies on the rails of the rail structure. The center rib portions of the top and bottom sash and screen frame elements adjacent the ends thereof are provided with openings 55 in which are received the oppositely bent out tongues 56, 56 at the center of resilient glider elements 57. Each glider element is formed from flat strip spring material bent into sinuous form and contacting the surface of the center rib portion of the frame at each end of the glider element and at the mid length thereof at which point the tongues 56, 56 are located and contacting the edge of the rail at points intermediate the tongues 56, 56 and the ends of the glider element; the rail contacting surfaces being formed with longitudinally extending rail engaging grooves 58, 58. The vertical dimensions of the sash and screen assemblies and the rail structure, the depth of the rail receiving grooves in the sash and screen elements and the height of the rail elements are so proportioned that the distance from the outer face of a center rib portion at the top or bottom of a sash or screen assembly to the extreme outer edge of the opposite member of the assembly is slightly less than the distance between the extremities of opposing rails. Consequently, each of the sash and screen assemblies may be installed on the rails by first mounting the assembly on a lower rail with a pair of glider elements 57 interposed between the lower frame element thereof and the rail. Then by pressing downwardly and compressing the lower glider elements, the upper edge of the assembly can be brought into position below the edge of the opposite upper rail and with insertion of the upper pair of glider elements 57, the sash or screen assembly can be swung into position beneath the upper rail and released whereupon the assembly will be yieldingly supported on the rails with partial compression of the four glider elements on which it is mounted as shown in Figure 12. Removal of any sash or screen assembly can as readily be effected by the reverse of the foregoing steps. Sealing between the vertical components of the sash and screen elements at the center of the window may be by any desired resilient means. A convenient and economical form is shown in Figures 2 and 4 and comprises a pair of thin resilient metal strips 59 having one edge thereof shaped as at 60 to snap over the inturned edges 43 of the side member of the outer most sash assembly remote from the side of the rail structure; each of said strips extending laterally over the opposite side surfaces of the member to which they are attached and being bowed outwardly therefrom as indicated at 61 sufficiently to be slightly compressed when contacted by the side member of an adjacent sash or screen assembly. While here shown as attached to the opposite sides of the sash assembly between the other sash assembly and the screen assembly, it will be realized that the resilient strips may equally be installed on the adjacent surfaces of said other sash assembly and said screen assembly with equally effective sealing.

Movement of the sash and screen assemblies along their respective rails may conveniently be accomplished by handles attached to the vertical components of the frame elements thereof; one such arrangement being shown by way of example in Figures 1 and 4. In the illustrated embodiment, the inner sash assembly 39 carries a handle 63 having a U-shaped portion 64 fitting into the rail receiving groove 42 of one of the vertical members thereof; the inturned edge portions 43, 43 being cut away for reception of the portion 64 of the handle, and a screw 65 secures the handle to the outer surface of the center rib portion 41 of the vertical frame member. To provide clearance for the handle, the flange 31 of the adjacent vertical component of the rail structure is notched as indicated at 66. A similar handle 67 is similarly attached to the side of the screen element 38 by a screw 68; the rail element 29 being notched as at 69 to provide clearance for the shank 70 of the handle and the handle being disposed wholly at the outer surface of the rearmost or inner sash element 39. The other sash element may be similarly provided with a handle 71 of the same character as the handle 63; the rail element 30 being notched to provide clearance for the shank of the handle. To secure the sash and screen assemblies in closed position, spring latch elements 72 and 73 may be provided for the rearmost sash element and screen element. The latch element 72 is formed from a strip of spring material secured at one end of the vertical rail element by a rivet 74 and is bent to provide a detent portion 75 and an operating handle portion 76. The handle 63 is provided with an inwardly projecting tongue 77 over the end of which the detent 75 may spring to lock the sash component in closed position as shown in Figure 4. The latch element 73 is likewise formed from a strip of spring material having one end thereof attached by a rivet 73' to the base portion 25 of the vertical component of the rail structure and having the free end thereof bent to provide a detent portion 79 engageable over the end of the tongue 79' of the handle 67 in the same manner as described in connection with the handle 63; the free end 80 of the latch element disposed for use as a latch operating handle. A similar latch means may be provided for the outermost sash element at the opposite side of the assembly. Other types of locking means may also be employed; the above-described means being shown merely to illustrate one such means.

Referring finally to Figure 15, there is shown a modification of the invention comprising the adding of two more rails 82 and 83 to the rail structure elements to accommodate storm window assemblies 84 and 85 in front of the screen assembly. Additionally instead of the spring tongues 27 engaging the rib 26 of the rail carrying element, the element is formed with an outwardly extending abutment 86 which engages the rear face of the run 7 of the window frame member 1. While the screen is here shown as located between the two pairs of sash assemblies it will be appreciated that if desired the screen may be located at the outside of the sash assemblies by the mere interchange of said assemblies in the manner of such removal and installation above described.

Thus there has been provided a metal window and frame construction which is economical to manufacture; the main components being formed from long lengths of preformed material cut to desired length, which may be readily installed in wall openings by persons of limited skill, which when installed, presents a neat appearance and which is both durable and easy to operate. While in the foregoing specification, the disclosure has been of a form of the invention including sash and screen components movable horizontally, it will be appreciated that these components may as readily be arranged to engage the rail elements and be moved vertically thereon if desired for specific installations. Accordingly, the invention is not to be deemed to be limited to the exact form disclosed, but to include as well all such modifications in the parts and in the construction, combination and arrangement of parts as shall come within the purview of the appended claims.

I claim:

1. In a metal window construction, a frame structure comprising members extending around the perimeter of a rectangular wall opening and clampingly engaging the wall surfaces adjacent the opening, a rail structure mounted on said frame structure comprising elements of uniform configuration in cross section and including a base portion disposed parallel to the surface of said frame structure within the opening, an outwardly extending flange at the front edge of said base portion, an inwardly extending flange at the rear edge of said base portion, an outwardly extending rib at the rear edge of said base portion and a series of window supporting rails extending parallel to each other and projecting inwardly from said base portion; said rail structure being constructed and arranged for assembly with said frame structure by insertion from the front side of said frame structure, and a series of spring tongues carried by said frame structure engaging said outwardly extending rib on said base portion of said rail structure effective to prevent removal of said rail structure from said frame structure.

2. In a window construction, a metal frame structure comprising cooperating pairs of inner and outer frame elements for each side of the opening, one element of each pair including a web section and oppositely extending flanges at either longitudinal edge, one of said flanges having an in-turned rim adapted to seat resiliently against a side wall adjacent a window opening, the other element of each pair having a web section and flanges along either longitudinal edge, one of said flanges projecting away from a window opening and having an in-turned wall-contacting rim, the other of said flanges being of U-shape and adapted to enclose the adjacent flange on the other frame element of each pair, and fastener means spaced longitudinally along said frame elements adapted to extend through one leg of said U-shaped flange into adjustable clamping engagement with the flange of the other frame element enclosed by said U-shaped flange to clamp said frame elements together against the inner and outer side edges of a window opening, the bight portion of said U-shaped flange has a plurality of spring tongues struck inwardly from the bight portion thereof toward the window opening and operable to engage behind a radial shoulder of a rail element for a window sash to lock the rail element against reverse movement thereby holding the rail assembled to said metal frame structure.

3. In a window construction, a metal frame structure adapted to be clamped about the top, bottom and side edges of a window opening, said frame structure having a bead of rectangular cross section projecting radially inwardly from the web portion thereof, spring tongue means secured to the inner side wall of said bead having free ends equidistantly spaced from a vertical edge of said bead, and a metal rail framing assembly having an outer side wall adapted to nest within said bead, said rail framing assembly having a pair of outwardly extending parallel flanges, one of said flanges being low and adapted to nest into the opening formed by said bead and into locking engagement with said spring tongues, and the other and longer of said flanges being adapted to seat against a radial face of said bead as said spring tongues engage behind said low flange thereby locking said rail framing assembled in place.

References Cited in the file of this patent

UNITED STATES PATENTS

| | | |
|---|---|---|
| 1,596,507 | Otto | Aug. 17, 1926 |
| 1,659,657 | Levan | Feb. 21, 1928 |
| 1,919,367 | Hamm et al. | July 25, 1933 |
| 1,974,798 | Dunning | Sept. 25, 1934 |
| 1,995,764 | Bohnsack | Mar. 26, 1935 |
| 2,446,375 | Liberty | Aug. 3, 1948 |
| 2,564,264 | Knott | Aug. 14, 1951 |
| 2,582,765 | Brew | Jan. 15, 1952 |
| 2,614,665 | Floyd | Oct. 21, 1952 |
| 2,636,227 | Altwies | Apr. 28, 1953 |
| 2,742,117 | Tolman | Apr. 17, 1956 |

FOREIGN PATENTS

| | | |
|---|---|---|
| 662,248 | Great Britain | Dec. 5, 1951 |